CROSS FIELD MAGNETIC TRANSDUCER HEAD

Filed July 24, 1961 4 Sheets-Sheet 1

INVENTOR.
Marvin Camras
BY
Hill, Sherman, Meroni, Gross & Simpson
ATTORNEYS

CROSS FIELD MAGNETIC TRANSDUCER HEAD

INVENTOR.
*Marvin Camras*

BY

*Hill, Sherman, Meroni, Gross & Simpson*
ATTORNEYS

INVENTOR.
Marvin Camras
BY Hill, Sherman, Meroni, Gross & Simpson
ATTORNEYS

INVENTOR.
Marvin Camras
BY
Hill, Sherman, Meroni, Gross & Simpson
ATTORNEYS

United States Patent Office 3,334,192

Patented Aug. 1, 1967

3,334,192

CROSS FIELD MAGNETIC TRANSDUCER HEAD

Marvin Camras, Glencoe, Ill., assignor to IIT Research Institute, a corporation of Illinois Filed July 24, 1961, Ser. No. 126,121
26 Claims. (Cl. 179—100.2)

Applicant hereby claims the benefit of the filing dates of his copending application Ser. No. 434,281, filed June 3, 1954 (now Patent 3,049,790, issued Aug. 21, 1962), and of his application Ser. No. 249,348, filed Oct. 2, 1951 (now Patent 2,785,232 issued Mar. 12, 1957), pursuant to 35 U.S.C. 120.

This invention relates to a magnetic transducer assembly for recording signals on magnetic record media and/or reproducing signals which have been recorded on such media, and also concerns a magnetic transducer assembly utilizing a single magnetic transducer head construction for both recording and playback functions.

The present invention provides a magnetic transducer assembly giving superior frequency characteristics and less distortion at very low record medium speed or in high frequency applications and particularly relates to improvements over Patent No. 2,803,708, issued Aug. 20, 1957. In accordance with a preferred embodiment as disclosed in said prior patent, the erase gap of an erase-record head assembly is placed sufficiently closely to the record gap so that high frequency flux extends in air from one of the erase poles to the region of the recording gap and is of magnitude adjacent the recording gap to produce a substantially more desirable bias field configuration in the region of the recording gap.

While maintaining the advantages of said previous patent, the present invention provides important new concepts which significantly improve the effectiveness of the recording and playback functions and make possible a simple low cost record-playback head assembly which is practical for use in medium and low priced recording machines. A head assembly in accordance with the present invention gives excellent distortionless low frequency response without the sacrifice of high frequency response at tape speeds of 1⅞ inches per second or lower. It allows the use of extremely short high resolution gaps which could not ordinarily be used for recording, and of relatively thick magnetic tape layers for high output and uniformity at medium and long wavelengths. A preferred construction utilizes a recording-playback assembly with a pair of gaps defined by a series of three poles across which the tape successively travels. Preferably a composite arrangement including outer strips of copper or other non-magnetic material and a center strip of magnetic material define the second or center pole between the two outer poles and the gaps at either side of the center pole. By this construction, the gaps are permanently and accurately located with respect to each other and may be made as close together as desired. The gap defining faces of the poles may be polished to high precision, and the three pole head may be assembled as readily as a conventional head.

The tape or other suitable record medium may travel first over a relatively large non-magnetic gap and then over a relatively fine gap suitable for high density recording or playback. In accordance with one embodiment of the present invention, the high frequency field across the first relatively large gap is not required to perform an erase function and thus may be precisely of optimum configuration and intensity for aiding in the recording function of the head assembly.

A preferred construction further provides means for applying the signal magnetomotive force at the outer pole adjacent the large gap so as to provide a relatively uniform signal field adjacent the small gap in the region where the bias field has a sharp gradient. Thus the signal field persists at substantially full strength as the bias field intensity falls off along the path of the tape beyond the small gap; this produces a recording of the signal field of greater intensity than is the case where the recording signal field and bias field are both attenuating at the same rate along the path of the tape beyond the small gap.

A further feature of the preferred embodiment resides in the provision of a metal casing for the transducer head made of a material having a thermal expansion coefficient similar to that of the core material of the head to provide a more stable gap configuration.

The present invention also makes possible the provision of an erase gap or gaps in the head assembly which may also be provided by a sandwich type construction for simplicity and so as to place the erase gap or gaps as close as possible to the recording section of the head to insure proper tracking of the tape over all of the gaps. A single head including provision for the erase function is economical and reduces problems of mounting and alignment between the erasing and recording sections. By the present invention the magnetic circuit between the erase and record sections may readily couple an optimum level of high frequency field from the erase section to the recording section.

Stereo or multiple heads may employ the concepts of the present invention. Thus two or more laterally spaced cores may cooperate with a larger area center pole arrangement common to all of the head units. Alternatively, separate center pole assemblies may be used for each head unit with shield members extending longitudinally of the tape path between the successive separate head units.

It is therefore an important object of the present invention to provide a novel and improved magnetic transducer assembly for magnetic record media providing higher resolution, better frequency response and less distortion at very low speeds or in high frequency applications.

A further object of the present invention is to provide a relatively simple and inexpensive transducer head for high density recording or playback applications.

Still another object of the present invention is to provide a novel magnetic recording head structure providing excellent distortionless low frequency response without sacrifice of fidelity at high frequencies and which is particularly adapted to low record medium speeds such as 1⅞ inches per second or less.

A further object of the present invention is to provide a novel magnetic transducer head having a gap configuration of great accuracy and stability.

A still further object of the invention is to provide a novel combined erase record and playback transducer assembly for use with magnetic record media and to provide a novel stereo or multiple head assembly having a common center pole configuration.

Other objects, features and advantages of the present invention will be apparent from the following detailed description taken in connection with the accompanying drawings, in which.

As shown on the drawings.

Figure 1:
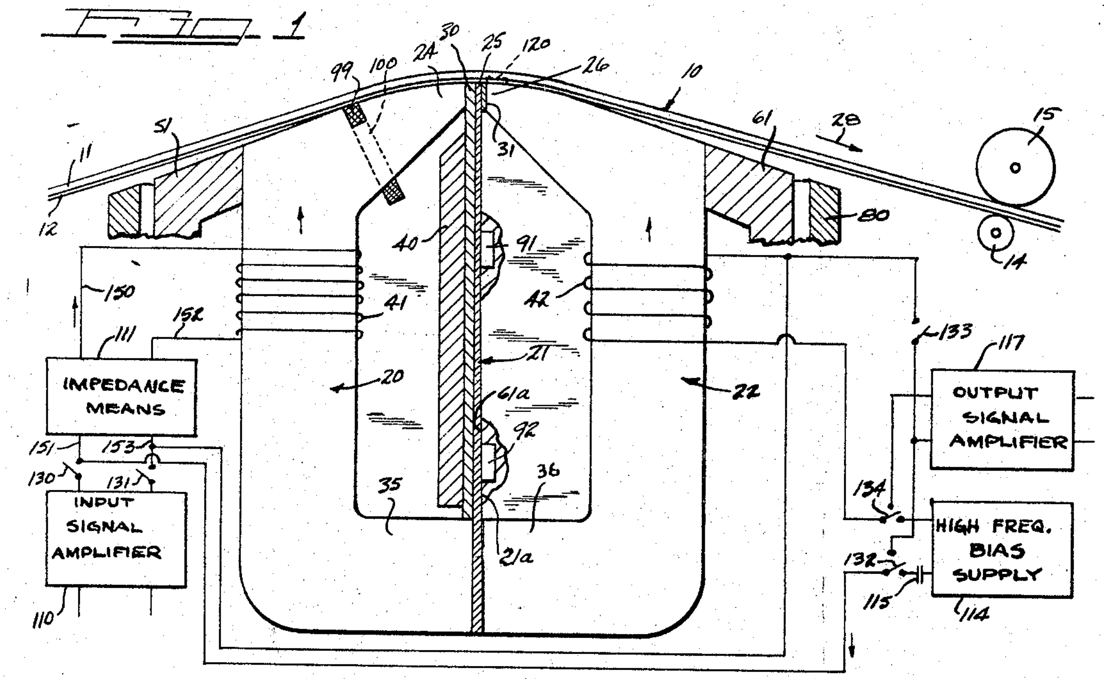
FIGURE 1 is a somewhat diagrammatic vertical cross sectional view of a magnetic transducer head construction in accordance with the present invention and illustrating suitable circuit components connected to the windings of the head for carrying out recording and playback operation.
Figure 2:
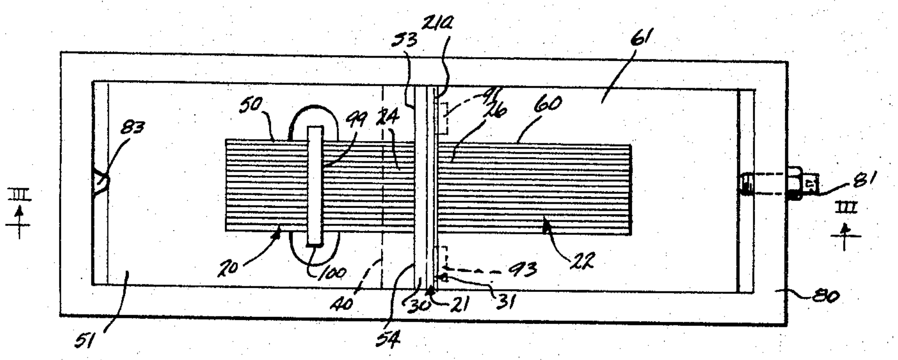
FIGURE 2 is a somewhat diagrammatic top plan view of the structure of FIGURE 1.
Figure 3:
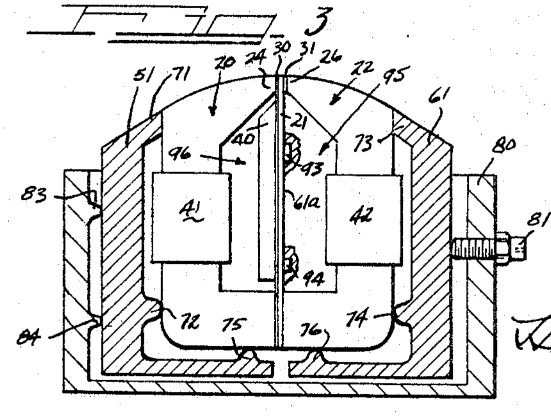
FIGURE 3 is a somewhat diagrammatic vertical cross sectional view taken along the line III—III of FIGURE 2 and illustrating the manner in which the two halves of the head assembly may be cemented together without detriment to the non-magnetic gap therebetween.

FIGURES 1, 2 and 3 illustrate a magnetic transducer head assembly for recording signals on a magnetic record medium 10 and for electrically reproducing the signals previously recorded on the record medium by the head assembly. By way of example and not of limitation, the record medium 10 may be in the form of a magnetic tape having a non-magnetic base 11 and a magnetizable layer 12 comprising a suitable magnetizable powder dispersed in a suitable non-magnetic binder. By way of example, the tape record medium 10 may be supplied from a supply reel (not shown) moved across the head assembly by means of a capstan roll 14 and pressure roll 15 at a constant speed and then wound upon a take-up reel (not shown). The present head assembly is particularly adapted to provide distortionless low frequency response without the sacrifice of high frequency response at low speeds such as 1⅞ inches per second, or below. Similar benefits are obtained at higher tape speeds, however.

The transducer head assembly comprises a magnetic core with three legs 20, 21 and 22 having polar extremities 24, 25 and 26 across which the record medium 10 successively travels as it moves in the direction of the arrow 28. A relatively long gap between the extremities or poles 24 and 25 may be rigidly defined by means of a strip 30 of copper or other suitable electrically conductive non-magnetic material. A second relatively fine gap between poles 25 and 26 may be provided by a gap spacer 31 which may be of copper or other suitable metallic non-magnetic material. By way of example, the non-magnetic stip 30 may comprise a strip of copper having a thickness of .002 inch in the direction of travel of the record medium, the magnetic center leg 21 may comprise a sheet of "Deltamax" (50% nickel and the remainder iron and minor constituents), "Carpenter 49" (49% nickel and the remainder iron and minor constituents), "4–79 Molybdenum Permalloy" (4% molybdenum, 79% nickel and the remainder iron and minor constituents), or "Supermalloy" (5% molybdenum, 79% nickel and the remainder iron and minor constituents), and the gap spacer 31 may comprise a copper strip of .0001 inch or .00005 inch thickness in the direction of movement of the record medium. Where especially high flux-carrying capacity is desired during recording, leg 21 may be made of a cobalt-iron alloy such as "Supermendur." Where especially good initial permeability is desired during playback, leg 21 may be made of "Supermalloy." It may also be made of layers, some of which impart high flux capacity, and others high initial permeability.

In the illustrated embodiment, the outer legs 20 and 22 of the magnetic core have inturned lower end portions 35 and 36 which are spaced apart to receive the lower end of the sheet 21 of magnetic material. Beryllium copper is preferred for the spacer members 30 and 31.

A sheet 40 of non-magnetic conductive material may be secured to the gap spacer 30 and extend centrally of the core to provide further shielding between core legs 20 and 21 and may have a thickness in the direction of movement of the tape of .005 inch. A piece of high permeability material, preferably laminated may be placed along and in contact with leg 21 beginning at a point spaced well below pole 26 to increase the flux carrying capacity of leg 21.

Windings 41 and 42 are wound on the core parts 20 and 22, and the core part 20 which may be made up of a stack of laminations of magnetic material is inserted in a receiving groove 50 of a casing part 51. The gap spacer sheet 30 may be suitably secured to the faces 53 and 54 of the casing 51 and to the planar face of pole portion 24. The center pole sheet 21 may then be suitably secured to the outer surface of the gap spacer member 30 for example by means of a thin layer of a suitable cement. Similarly the leg 22 of the core may comprise a stack of generally C-shaped laminations and may be placed in a suitable recess 60 of a casing part 61. The casing parts 51 and 61 may be of a suitable non-magnetic material having substantially the same coefficient of expansion as the magnetic material of core legs 20 and 22; for example, the coefficient of expansion of nickel-iron cores containing 79% nickel is about $12.5\times10^{-6}$; for cores of 50% nickel content it is about $9.5\times10^{-6}$. Non-magnetic stainless steel having a coefficient of about $10\times10^{-6}$, and Monel metal with a coefficient of $14\times10^{-6}$ may be used for the case. A closer match is possible with special alloys. The casing parts 51 and 61 may engage the legs 20 and 22 at boss portions 71–76 for accurate three point positioning of each of the legs.

Thus, in assembling the head construction, a first sub-assembly is formed including the casing part 51 and core legs 20 and 21, while a second sub-assembly is formed including case part 61 and core leg 22. The polar faces of poles 25 and 26 are then polished to optical flatness, and the two sub-assemblies are placed in mating relation with spacer strip 31 therebetween. The completed unit may then be placed in a suitable frame 80, FIGURE 3, which may serve as a shield, with a set screw such as indicated at 81 acting on the casing part 61 and cooperating bosses such as indicated at 83 and 84 acting on the casing part 51 to press the two sub-assemblies toward each other. The polar faces of poles 25 and 26 are thus urged against opposite sides of gap spacer 31. Alternatively, a wedge may be used instead of set screw 81.

The two sub-assemblies are preferably cemented together at their mating surfaces such as indicated at **21*a* and 61*a* in FIGURE 1 by suitable means such as a cement to prevent side shift between the two sub-assemblies. Where the gap spacer 31 has a thickness dimension of .0005 inch or less, the cement may be placed in a recess or recesses such as indicated at 91 and 92 in FIGURE 1 adjacent mating face 61*a* of casing part 61. Further recesses may be located as indicated at 93 and 94 in FIGURES 2 and 3. This prevents the build up of any additional spacing between poles 25 and 26** for extremely fine gap thicknesses.

The present invention further contemplates leaving air spaces at 95 and 96 in the final head assembly so that there is no problem of expansion or swelling with heat or humidity which would open the fine gap between poles 25 and 26 as would be the case if these spaces were filled with epoxy resin or the like. Any cement which is used, for example between the bosses 71–76 and the legs 20 and 22 is in a thin layer which cannot appreciably affect the gap dimension.

An erase gap may be located as indicated at 99 and may be energized by a coil such as indicated at 100 in FIGURE 1 or by a single conductor of cross section corresponding to the gap space 99 and extending therethrough. Such a conductor may form a closed circuit around leg 20 at 100 to obtain its energy from coil 41.

In the embodiment of FIGURE 1, an input signal amplifier 110 or other input signal supply means is connected to the winding 41 either directly or through a suitable impedance means 111. The impedance means 111 has particular significance during the playback operation of the assembly but in some instances may be used during recording. It may be desirable to adjust the phase relationship between the cross field and main bias field during recording and this may be accomplished by component 111. A high-frequency bias supply component 114 is illustrated for connection to the windings 41 and 42 in series during the recording operation. A by-pass capacitor 115 is illustrated for transmitting bias frequency current which may have a frequency of 20 kc. to 300 kc. or higher, for example, while blocking signal frequency current. It will be observed that the windings 41 and 42 are connected in series across the high frequency bias supply component 114 and that the windings are connected in series opposing relation with respect to the magnetic circuit including core legs 20 and 22. By way of example, the winding 41 may have 250 turns where the winding 42 has 42 turns. The high frequency bias current flowing in windings 41 and 42 may be such as to produce a bias field at the region of pole portion 26 in the path of tape 10 which diminishes much more rapidly as a function of distance from the gap 31 in the direction of tape movement than the bias field produced by winding 42 between poles 25 and 26 considered by itself. This phenomenon has been explained in detail in my prior Patents Nos. 2,628,285, issued Feb. 10, 1953, and 2,803,708, issued Aug. 20, 1957. The field pattern produced with the winding arrangement and connections just described would correspond to that shown in FIGURE 3 of Patent No. 2,803,708 and provide a more uniform bias field through the thickness dimension of the magnetizable layer 12, a bias field at the trailing pole 26 which is more nearly longitudinal in character with respect to the direction of movement of the record medium and one having a very rapidly decaying magnetic intensity in the region of the trailing pole 26. In fact, such a field configuration has a null point near the gap 31 above the trailing pole 26 where the leakage field from pole 24 produced by winding 41 effectively cancels the main bias field between poles 25 and 26 which is produced by winding 42.

While in certain embodiments of said previous Patent No. 2,803,708, the high frequency field between poles corresponding to poles 24 and 25 in FIGURE 1 was of sufficient intensity to erase a saturation signal on the record medium, in the present instance, the high frequency field between poles 24 and 25 ordinarily has an intensity less than the saturation field intensity for the material of the record medium and is not of an intensity to insure erasure of record medium 10. This is a result of the present construction where the distance between the X-field gap and the following signal gap is equal to or less than the size of the X-field gap.

In the illustrated embodiment, the lower frequency signal current is supplied only to the winding 41 and serves to provide an effective recording field between poles 24 and 26 which is of substantially constant strength in the effective recording region above pole 26 indicated by the rectangle 120 where the bias field rapidly decays to an insignificant intensity. Thus the recording signal field due to the signal current in winding 41 persists substantially at a full strength value as the bias field falls off in intensity beyond the gap 31 in the path of the magnetizable layer of the record medium 10. This results in the recording of a signal of greater intensity on the record medium for a given value of signal current in winding 41 than would be the case if the signal current were also supplied to winding 42, or were supplied to a signal winding on leg 22 only. This recording arrangement with signal current supplied to winding 41 only provides substantially as good resolution as would be obtained where the cross field principle is applied both to the bias and signal frequencies. The arrangement is superior to the case where the signal current is supplied to a winding on leg 22, since it provides a higher magnetization level on the tape record; a greater recording sensitivity, because a given signal field will magnetize the record more strongly; and freedom from recording demagnetization where the bias field may partially erase a high frequency recording before this recording has left the gap field, and where the signal field does not reinforce the recording.

During playback, in one form of the present invention, one winding 42 only may be directly connected to the output signal amplifier 117. This corresponds to the case where switch means 130, 131 are in open condition, switch 132 is in its intermediate open circuit position as shown in FIGURE 1, switch 133 is closed and switch 134 is in its upper position. This arrangement provides an operable playback system utilizing the same head configuration as utilized during recording but under some conditions has been found to provide less than optimum frequency response characteristics since at certain recorded wavelengths, the portion of the magnetizable layer 12 bridging the gap 30 will set up a stray flux in the magnetic circuit including legs 20 and 22 and linking winding 42 in advance of the time when this recorded signal element of the magnetizable layer reaches the correct playback region. The result is that at certain frequencies a cancellation effect is produced reducing the output from the single coil 42 during playback. While this phenomenon might not be detrimental for certain applications and in certain frequency ranges, and while various external circuit expedients could be utilized for compensating for this effect, it has been found preferable to utilize at least a part of the winding 41 for inducing a counteracting voltage in response to stray flux from the record medium and to utilize circuit means for introducing this cancelling voltage at the output signal amplifier 117 so as to counteract the effect on the stray pick-up phenomenon in winding 42.

In one approach to this problem windings 41 and 42 are connected in series opposing relation across the terminals of the output signal amplifier 117, this condition being produced by opening switch 133 and placing switches 132 and 134 in their upper positions. If the impedance means 111 is omitted and lines 150 and 151, and 152 and 153 are directly connected respectively, perfect cancellation may not result since the number of turns for winding 41 has been selected to optimize the recording function rather than for best cancellation. On the other hand, optimum cancellation may also be achieved utilizing a winding 41 of the proper number of turns for recording by proper selection of the impedance means 111. By way of example, impedance means 111 may take the form of a potentiometer having its outer fixed terminals connected to lines 150 and 152 and having its movable contact connected with line 151, line 153 connecting directly with line 152, for example. With this arrangement, adjustment of the potentiometer adjusts the value of voltage supplied from winding 41 to the output signal amplifier 117 for optimum cancellation of the spurious voltage induced in winding 42. During recording, the potentiometer may be bypassed and not used. Another way to use the head of FIGURE 1 for playback is to connect coil 41 in series aiding relation with respect to coil 42 through a low pass filter at 111. The long wavelengths will then generate additive voltages in windings 41 and 42 to give enhanced low frequency response. At higher frequencies represented by shorter wavelengths, only the output from winding 42 is effective so that a minimum of interference results. This mode of operation is especially desirable where stray coupling between gap 30 and winding 42 is low. The low pass filter at 111 may also be used during the recording to enhance low frequency recording by coil 41.

In the embodiment of FIGURE 1, the non-magnetic strip 30 may terminate above the confronting lower end portions 35 and 36 of legs 20 and 22, the legs 20 and 21 then being placed in magnetic contact with each other in this region. Filler strips of non-magnetic material may be inserted between end portion 35 and the low part of magnetic sheet 21 to vary the reluctance of the magnetic circuit including legs 20 and 21 and its coupling to the leg 22.

With respect to the embodiment of FIGURE 1, assuming the impedance means 111 comprises a potentiometer having its outer fixed terminals connected to lines 150 and 152 and having its movable contact terminal connected to line 151 and one of its outer terminals connected to line 153, the potentiometer may be adjusted to a value during playback which will minimize the discontinuities which occur when only the winding 42 is utilized to generate the playback signal.

Figure 18:
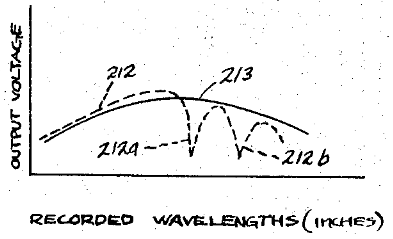
FIGURE 18 shows in dotted outline a plot of output voltage as a function of recorded wavelength for the case of a multigap playback head having a pair of closely spaced gaps using a playback winding on the trailing pole piece, and shows in solid outline a similar plot for a playback head such as shown in FIGURE 1.

FIGURE 18 shows a curve 212 representing the output voltage from winding 42 as a function of recorded wavelength on the tape 10 in the absence of any circuit means for compensating for the stray flux interference effect. It will be observed from FIGURE 18, that when a recorded half wavelength is approximately equal to the separation between the magnetic centers of gaps 30 and 31, the signal at gap 31 of the head will generate a voltage of one polarity in the winding 42, while the signal at gap 30 may produce a stray flux linking winding 42 and producing a voltage of opposite polarity at the winding 42. The stray voltage induced in winding 42 in this manner produces a cancellation effect at this value of recorded wavelength as indicated by dip **212*a* in the response curve 212. Similar but less significant dips occur at sub-multiples of this critical recorded wavelength, a further dip being indicated at 212*b* in the response curve 212** of FIGURE 18.

Since the stray flux linking winding 42 which produces these discontinuities also links winding 41, it is possible to utilize a voltage divider across winding 41 during playback to select a correct value of voltage to exactly cancel the effect of the stray flux in the winding 42. It is evident that the correct adjustment of the voltage divider can be determined by experiment by first obtaining a response curve such as indicated at 212 in FIGURE 18, then observing the critical recorded wavelength where the main discontinuity occurs, and by then adjusting the voltage divider to restore normal output from the head while a tape having the critical recorded wavelength travels across the head. When the first dip **212*a* in the original curve has been eliminated in this manner, the setting of the voltage divider then obtained is found to provide a frequency response curve such as indicated at 213 in FIGURE 18. It will be observed that for recorded wavelengths greater than the critical wavelength illustrated in FIGURE 18, flux is produced in the circuit including legs 20 and 22 predominantly, and an opposing voltage is thus induced in winding 41 at these low frequencies. This opposing voltage, however, does not substantially affect the frequency response characteristics of the head as will be apparent from a comparison of curves 212 and 213. At substantially higher recorded wavelengths, it will be understood that the gap 30 is relatively ineffective to produce a voltage in winding 41, and thus it will be understood that connection of the winding 41 in series opposing relation to the winding 42** during playback will not appreciably affect the high frequency response of the head.

Thus, it is possible to smooth out the frequency response characteristics of the head by the utilization of an opposing winding on leg 20 during playback. Various additional circuits for accomplishing this same result are illustrated in FIGURES 4 through 11 and will now be described to illustrate additional examples of circuitry for accomplishing a smooth frequency response characteristic as illustrated by curve 213 in FIGURE 18.

With reference to the embodiment of FIGURE 1, for example, if impedance means 111 takes the form of a low pass filter, windings 41 and 42 may be connected in series aiding relation during playback whereupon the two windings will produce aiding voltages in response to low frequency magnetic signal flux linking the magnetic circuit including legs 20 and 22. The head will thus provide increased output at low frequencies. At higher frequencies including those corresponding to the critical recorded wavelengths, the voltage induced in winding 41 will be blocked in the low pass filter 111 and will not appear at output signal amplifier 117.

During recording, the low frequency components of the input signal from amplifier 110 will be transmitted through low pass filter 111 to winding 41 while higher signal frequency and bias frequency will be blocked and not reach winding 41. If desired, during recording, bias supply 114 may be connected directly to winding 41 so that bias frequency is supplied to windings 41 and 42 in series as in previously described alternatives.

The core constructions for the embodiments of FIGURES 4 through 11 may be identical to that described in connection with FIGURES 1 through 3, and the description of FIGURES 1 through 3 is incorporated by reference with respect to each of the embodiments of FIGURES 4 through 11. The parts shown in FIGURES 1 through 3, but not shown in FIGURES 4 through 11 have been omitted simply for clarity of illustration and it is intended that the embodiments of FIGURES 4 through 11 include such parts.

Figures 4, 5, 6:
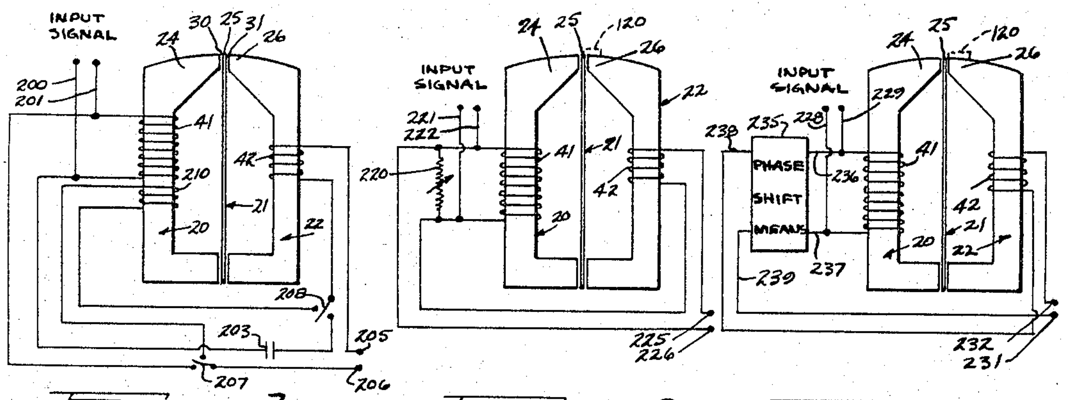
FIGURES 4 through 11 illustrate various circuit modifications for improving playback response in a combined record-playback transducer head assembly in accordance with the present invention.

In the embodiment of FIGURE 4, during recording, signal current corresponding to the signal to be recorded is supplied at leads 200 and 201 to the winding 41 but is illustrated as being blocked from winding 42 by means of capacitor 203. High frequency bias current is supplied to the windings 41 and 42 in series from terminals 205 and 206 with switch 207 in its lower position and switch 208 in its lower position so that the high frequency bias field above pole 26 due to winding 41 instantaneously is 180° out of phase with respect to the bias field produced in the recording region by winding 42, as in the embodiment of FIGURE 1.

During playback with the embodiment of FIGURE 4, switches 207 and 208 are placed in their upper positions to connect a winding 210 on leg 20 in series opposing relation to winding 42 on leg 22 across terminals 205 and 206 which in this case constitute the signal output means and would be connected to an output signal amplifier such as component 117 in FIGURE 1. The winding 210 has the correct number of turns for generating a cancelling voltage equal and opposite to the spurious voltage generated in winding 42 by stray flux linking the circuit including legs 20 and 22 at the frequencies where such stray flux otherwise produces an interference effect and introduces irregularities in the frequency response characteristics of the head.

By way of example, in designing a head as illustrated in FIGURE 4, the playback response may first be observed with the winding 42 only connected to the playback amplifier. This response curve will be generally as indicated in FIGURE 18 at 212 and will include discontinuities such as indicated at 212a and 212b. A further winding may now be placed on the leg 20 with a number of suitable taps so as to provide outputs from numbers of turns more than adequate to compensate for the effect and intermediate numbers of turns. The number of turns providing a smooth output curve as illustrated at 213 in FIGURE 18 may then be determined by experiment. It is found that the additional winding 210 does not change the shape of the frequency response of the head to recorded wavelengths greater than the interference wavelength, and it is further found that the high frequency response of the head for wavelengths shorter than the interference wavelength also remains satisfactory. At long recorded wavelengths greater than the interference wavelength, the signal voltage in coil 210 due to pickup at gap 30 is in phase opposition to the signal voltage in coil 42 due to pickup at gap 31, and their summation produces a slight reduction in output. At very short wavelengths, the long gap 30 is inefficient (and may be made even more so by rounding its edges, or not having the gap edges straight and parallel); thus the opposing voltage generated in winding 210 is of such a low value as to have little effect on the overall response of the head. Further, the voltage generated in the winding 210 by flux generated in the circuit including legs 20 and 21 has been found not to substantially distort the output signal.

The embodiment of FIGURE 5 illustrates the use of a variable resistor 220 as the impedance means represented by block 111 in FIGURE 1. An input signal may be supplied from an input signal amplifier such as 110 in FIGURE 1 via lines 221 and 222 during recording. Suitable switch means such as indicated at 130 and 131 in FIGURE 1 may disconnect the input signal amplifier 110 from lines 221 and 222 during playback. The input signal to be recorded may be blocked from winding 42 by means of a capacitor in series with the bias supply such as capacitor 115 in FIGURE 1, suitable switch means connecting the bias supply to terminals 225 and 226 during recording to supply high frequency bias current to the windings 41 and 42 in series and to produce high frequency magnetic fields in the recording region 120 which are 180° out of phase as in FIGURE 1. By way of example, during recording, variable resistor 220 may set to its maximum value so as to be effectively eliminated from the high frequency bias circuit.

During playback as in the previous embodiments, the bias supply and its capacitor 115 are effectively eliminated from the circuit, and the windings 41 and 42 are connected in series opposing relation across the terminals 225 and 226 which then constitute the signal output means and may be connected to the input of a suitable output signal amplifier such as 117 in FIGURE 1. During playback, the variable resistor 220 is adjusted to the value which provides optimum frequency response of the head as indicated by curve 213 in FIGURE 18 and eliminates the discontinuities such as indicated at 212a and 212b which are experienced when only the winding 42 is utilized during playback. It will be understood that once the correct value of variable resistor 220 has been determined for optimum playback response, a fixed resistor may be substituted of this optimum value and the resistor may be permanently connected across the winding 41. Alternatively, a fixed resistor of the optimum value may be connected across the winding 41 by means of a switch during playback and the switch may be opened to disconnect the resistor from across the winding 41 during recording. Where a variable potentiometer or other voltage divider is substituted for element 220, terminal 226 would be connected to the movable tap of the potentiometer instead of the upper fixed terminal of 220 in FIGURE 5, during playback. Once the optimum setting has been determined for playback, two fixed resistors in series may be substituted for the potentiometer, and switch means incorporated for connecting the resistor corresponding to the desired voltage fraction in circuit with the winding 42 during playback. During recording, the fixed resistors may be switched out of the circuit, or may have such a total value as to have a negligible effect on the recording characteristics of the head. In the latter case, during recording, the winding 42 would be connected in series with a network including both resistors of the voltage divider in parallel with the winding 41.

In FIGURE 6, during recording, the input signal is supplied by lines 228 and 229 to winding 41 only and bias frequency current is supplied from terminals 231 and 232 to windings 41 and 42 in series. As in the previous embodiments, the high frequency bias fields produced by windings 41 and 42 may be 180° out of phase at the recording region 120. During playback, winding 41 is again connected in opposing relation with respect to winding 42 and a phase shift device 235 is interposed between lines 236, 237 and 238, 239 to introduce an optimum value of cancelling voltage at the output signal means 231, 232 as in the previous embodiments. The phase shift device 235 may be adjusted to give an optimum magnitude and phase of voltage at 238, 239 at the critical recorded wavelength to counteract the voltage component in 42 which produces dip 212a in FIGURE 18. By way of example, the phase shifting network may comprise an RC or an RL circuit. In either case, the values of the components of the network are selected for optimum cancellation to provide a smooth frequency response curve as indicated at 213 in FIGURE 18.

The impedance means 111 of FIGURE 1 may represent a potentiometer, a variable resistor such as 220 in FIGURE 5 or a phase shift device such as 235 in FIGURE 6 and may comprise components of fixed predetermined value which may be left in the circuit during recording, as well as during playback where their function is actually required.

Figures 7, 8, 9:
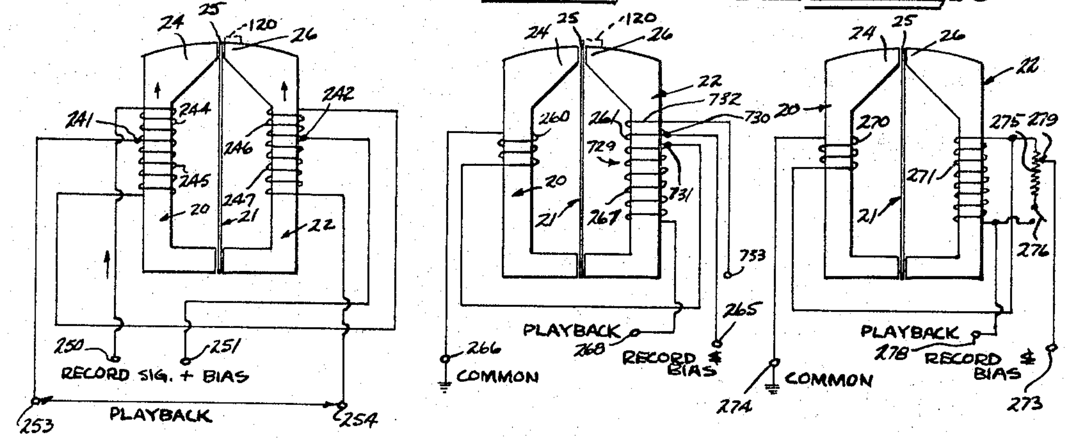

In the embodiment of FIGURE 7, the windings on legs 20 and 22 have taps as indicated at 241 and 242 which divide the windings into sections 244, 245 and 246, 247. During recording, the signal to be recorded together with the high frequency bias superimposed thereon is supplied to input terminals 250 and 251 to supply high frequency bias current to windings sections 244 and 245 on leg 20 and to winding section 246 on leg 22. The field produced by winding sections 244 and 245 is substantially 180° out of phase with the field produced by winding section 246 at the recording region 120 as in the previous embodiments. In this case, however, a sharp gradient is produced in the recording region 120 both for the signal field and the high frequency bias field. During playback winding section 245 on leg 20 is connected in series opposing relation to winding sections 246 and 247 on leg 22 to provide the compensated frequency response characteristic indicated at 213 at FIGURE 18. Thus, recording winding section 246 may have 42 turns where winding sections 244 and 245 provide a total of 250 turns. Winding section 247 together with winding section 246 may provide an optimum number of turns for playback operation, as for example 1000 to 3000 turns when operated in the grid circuit of a vacuum tube amplifier, and winding section 245 may have a number of turns selected experimentally to properly compensate for the interference effects such as indicated at 212a and 212b in FIGURE 18 exactly in the manner previously described for FIGURE 4, for example. Terminals 250 and 251 constitute the signal and bias supply means in FIGURE 7 while terminals 253 and 254 constitute the signal output means in this embodiment.

In the embodiment of FIGURE 8, winding section 260 on leg 20 may have 250 turns where winding section 261 has 42 turns and these two winding sections may be connected in series aiding relation between terminals 265 and 266 with respect to the recording region 120. Both recording and bias frequency may be supplied to terminals 265 and 266 during recording to produce effective recording and bias fields in the recording region 120.

When connected for playback, the coils 260 and 267 are in series opposition, so that coil 260 generates a voltage that counteracts interfering pickup in winding 267 from the left hand gap. The number of turns on coil 267 may be chosen for proper matching to the playback amplifier. The turns on coil 260 are then chosen to minimize playback interference, and finally the coil 261 is chosen to have the number of turns relative to 260 so that adequate biasing action is obtained. Alternatively, coil 261 may be wound oppositely to the direction shown in FIGURE 8 (opposite the direction of coil 267) in which case the main bias and recording fields will have a different phase relative to the cross fields from winding 260. Terminals 265 and 266 constitute the recording and bias supply means in this embodiment and terminals 268 and 266 constitute the signal output means. This embodiment is simple with regard to switching, head winding, and auxiliary components.

In the embodiment of FIGURE 9, winding sections 270 and 271 are connected between the recording and bias supply terminals 273 and 274 under the control of a potentiometer 275 during recording. In this embodiment, winding sections 270 and 271 may have the correct numbers of turns to provide optimum playback operation as illustrated by curve 213 in FIGURE 18 with switch 276 opened to disconnect potentiometer 275 from the circuit. The output signal is taken from playback terminals 278 and 274. During recording, the movable contact 279 of potentiometer 275 is moved to the position providing optimum recording operation. It will be understood that where winding 270 has 250 turns, winding 271 will have substantially more than the 42 turns which would provide optimum bias field configuration. The potentiometer 275 serves to effectively adjust the bias field produced by winding 271 to correspond to that which would be produced by a winding of a lesser number of turns directly in series with winding 270. The winding turns are illustrative only, since the number and proportion depend on gap sizes, pole piece dimensions, etc.

Figures 10, 11:
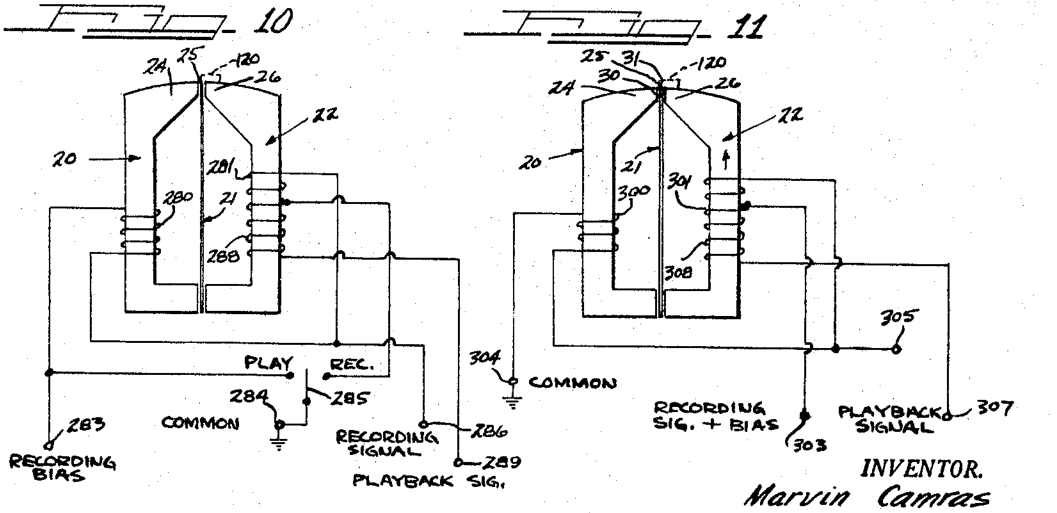

In the embodiment of FIGURE 10, winding sections 280 and 281 are connected in series opposing relation with respect to recording region 120 between recording bias terminals 283 and 284 when switch arm 285 is in the record position. The recording signal applied to terminals 286 and 284 is applied only to the winding section 281 on leg 22 of the core. Where winding section 280 has 250 turns, for example, winding section 281 may have 42 turns to provide an optimum bias field configuration in the recording region 120.

During playback, winding section 288 is in series with winding sections 281 and 280 between playback terminals 289 and 284 with switch 285 in the play position. As in the previous embodiments, the total number of turns of sections 281 and 288 is related to the number of turns of section 280 to provide the response characteristics indicated at 213 in FIGURE 18.

In the embodiment of FIGURE 11, winding sections 300 and 301 are connected in series opposing relation between terminals 303 and 304 during recording and receive the signal to be recorded together with a superimposed high frequency bias to provide a sharp gradient in the longitudinal component of both the signal field and the bias field in the recording region 120 of the head. Alternatively, only the high frequency bias may be supplied between terminals 303 and 304, and the signal current may be supplied between terminals 303 and 305 to energize the winding section 301 only. As a further alternative, the recording signal may be supplied between terminals 305 and 304 to energize winding section 300 while the high frequency bias is supplied between terminal 303 and 304. In this latter instance, the signal field will not fall off with distance from gap 31 as rapidly as the high frequency bias field in the recording region 120.

During playback, the output amplifier may be connected between terminals 307 and 304 wtih winding section 308 added in series with winding section 301 on the leg 22 and with winding section 300 in series opposing relation to provide the desired frequency response characteristic indicated at 213 in FIGURE 18.

In the embodiment of FIGURE 11 winding section 300 is proportioned with respect to the total number of turns of winding sections 301 and 308 to neutralize the effect of stray magnetic flux from the record medium at gap 30 which is coupled into the magnetic circuit including leg 22 during playback. Coil section 301 is proportioned with respect to coil 300 to give the desired cross field at the bias frequency so that both the low frequency and high frequency signals can be recorded with the same optimum value of bias. This is achieved by producing a resultant bias field which is relatively uniform throughout the cross section of the magnetizable layer 12.

As a further alternative, it will be noted that the bias supply may be connected to terminals 305 and 304 in FIGURE 11 and the signal supply connected between terminals 303 and 304 to produce a sharp gradient in the resultant signal field in the recording region 120 while providing a relatively uniform bias field in the recording region 120 which does not fall off in intensity as rapidly as the signal field.

A preferred recording embodiment in FIGURE 11 is with the bias supplied to terminals 303 and 304, and the signal applied to 304 and 305, so that the signal field persists at substantial amplitude beyond the biased regions in the tape.

Figure 12:
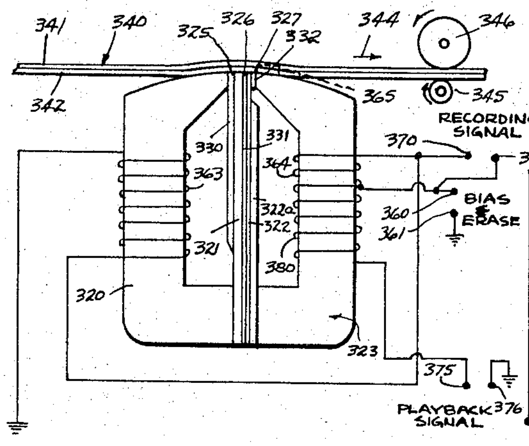
FIGURE 12 illustrates an erase-record playback head assembly in accordance with the present invention.
Figure 13:
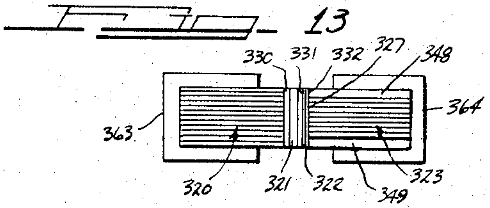
FIGURE 13 is a somewhat diagrammatic top plan view of the assembly of FIGURE 12.

FIGURES 12 and 13 illustrate an embodiment combining erase, record and playback functions in a single head construction wherein the erase gap is directly adjacent the record-playback gap to facilitate tracking of the tape over the successive gaps.

The head assembly of FIGURE 12 includes a pair of C-shaped outer legs 320 and 323 and inner legs 321 and 322 defining successively an erase gap 325, a cross field gap 326 and a record playback gap 327. The gaps 325, 326 and 327 have respective electrically conductive non-magnetic strips 330, 331 and 332 therein.

By way of example, the erase gap spacer may have a thickness of .002 inch and be of copper strip material, pole member 321 may be of a laminated construction with the laminations extending transversely relative to the laminations making up the legs 320 and 323. The strip 321 may be of "Permalloy" and may comprise 78.5% nickel and the remainder iron and minor constituents. The gap spacer member 331 defining gap 326 may have a thickness of .001 inch and be of copper strip material. The next inner leg 322 may have a thickness of .0005 inch and be of "Permalloy" or other suitable magnetic material, and the gap spacer strip 332 defining gap 327 may have a thickness of .00005 inch and also be of copper, preferably beryllium copper. Several additional shorter pieces of magnetic material such as "Permalloy" are indicated at **322*a* which lie against the leg 322 along the length thereof below the gap spacer 332, but do not extend up to the level of gap 327. The magnetic pieces 322*a* thus do not increase the spacing between gaps 326 and 327, but increase the flux carrying capacity of the magnetic circuit including legs 322 and 323**.

A tape record medium is indicated at 340 having a non-magnetic base layer 341 and a magnetizable layer 342 consisting of a powdered magnetic material in a suitable non-magnetic binder. The tape may be driven in the direction of the arrow 344 by means of a capstan 345 and pressure roller 346 and be unwound from a supply reel (not shown) and wound upon a take-up reel (not shown) after travel across the successive gaps 325, 326 and 327. As seen in FIGURE 13, the legs 320, 321 and 322 may have a width dimension transversely to the direction of movement of the tape substantially equal to the width of one channel on the tape 340, while the trailing leg 323 defining gap 327 has a reduced width and has a non-magnetic filler member of substantial thickness at each side thereof as indicated at 348 and 349 in FIGURE 13. It will be noted that the spacing between the erase gap and the cross field gap in this embodiment may be only .002 inch so as to minimize the possibility of tracking errors as the tape moves from the erase gap 325 to the cross field gap 326 and record-playback gap 327. The close spacing of the gaps together with the reduced width of the effective record-playback gap insures that the erase gap 325 will erase all of the record medium which is coupled to the record-playback gap 327.

During recording, a high frequency bias and erase supply is connected between terminals 360 and 361 to energize winding sections 363 and 364 in series opposing relation with respect to the recording region 365. The high frequency current supplied to windings 363 and 364 is operative to produce an erasing magnetic field across gap 325 for insuring complete erasure of the record medium 340 before it reaches the record gap 327. Additionally, winding section 363 produces a high frequency field across gap 326 which may insure more complete erasure in conjunction with erase gap 325. Winding 363 also produces a high frequency field in the recording region 365 which effectively modifies the bias field produced by winding section 364 to provide a sharp gradient of bias field intensity in the recording region 365 as in the previous embodiments. The signal to be recorded may be supplied to terminals 370 and 371 to energize winding section 364.

During playback, a playback amplifier is connected between signal output terminals 375 and 376. Winding section 380 on leg 323 is in series with winding 364 during playback, and winding 363 is in series opposing relation with respect to winding sections 364 and 380 during playback as in the previous embodiments to provide the desired smooth frequency response curve indicated at 213 in FIGURE 18.

Figure 14:
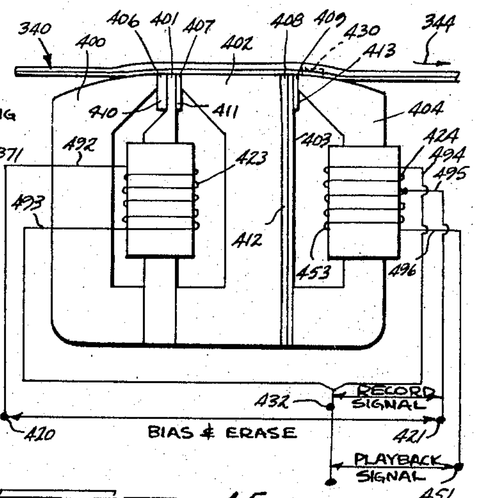
FIGURE 14 is a somewhat diagrammatic illustration of a further erase-record-playback transducer assembly in accordance with the present invention.
Figure 15:
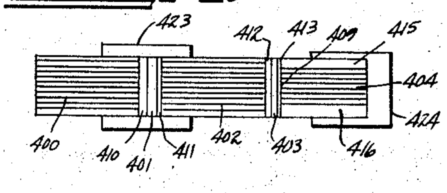
FIGURE 15 is a somewhat diagrammatic top plan view of the structure of FIGURE 14.

FIGURES 14 and 15 illustrate a combined-erase record-playback head utilizing two gaps in the erase head section. The head comprises a series of legs 400, 401, 402, 403 and 404 providing successive erase gaps 406 and 407, a cross field gap as indicated at 408 and a record-playback gap as indicated at 409. Gap spacers of electrically conductive non-magnetic material are indicated at 410, 411, 412 and 413 defining the successive gaps 406–409. By way of example, gap spacer 406 may comprise a strip of copper having a thickness of .003 inch, gap spacer 411 may comprise a copper strip having a thickness of .002 inch. The cross field gap spacer 412 may comprise a strip of copper having a thickness of .001 inch, leg 403 may comprise a sheet of "Permalloy" having a thickness of .0005 inch and gap spacer 413 may comprise a strip of copper having a thickness of .0001 inch. As in the embodiment of FIGURE 12, the trailing leg 404 in FIGURE 14 may have substantially less width than the other legs to define a narrower effective record-playback gap 409, and filler strips as indicated at 415 and 416 may be provided at each side of the leg 404 and are of substantial thickness in the direction transverse to the direction of tape movement indicated by arrow 344.

During recording, bias and erase high frequency current is supplied between terminals 420 and 421 to energize winding section 423 on leg 401 and winding section 424 on leg 404 in series opposing relation. This produces high frequency erase fields at gaps 406 and 407 and produces a high frequency field impinging on leg 404 at the recording region 430 opposing the bias field produced by winding 424 in this region. The recording signal may be supplied between terminals 432 and 421 to energize coil 424 with the signal to be recorded. The high frequency bias field component from winding 423 acts to modify the bias field to provide a sharp gradient of bias field intensity in the recording region 430 as in the previous embodiments.

During playback, an output amplifier is connected between terminals 432 and 451 so as to connect a winding section 453 in series with winding section 424. In this case the winding 423 is not used during playback.

Figure 16:
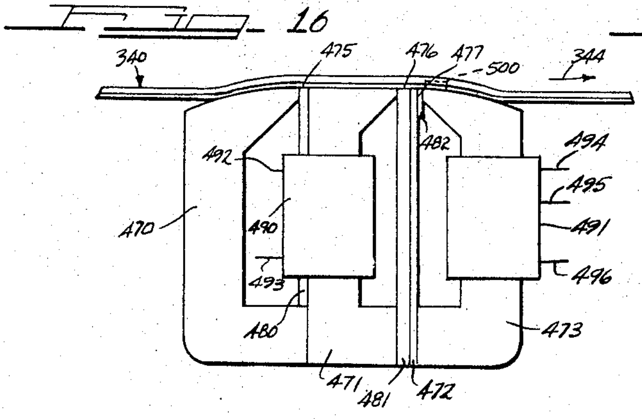
FIGURE 16 is a diagrammatic illustration of an erase-record-playback head assembly representing a modification of the embodiment of FIGURE 14.

In the embodiment of FIGURE 16, the combined erase-record-playback head has legs 470, 471, 472 and 473 defining an erase gap 475, a cross field gap 476 and a record-playback gap 477. Erase gap spacer member 480 may comprise .0015 inch thick copper, cross field gap spacer 481 may comprise .004 inch thick copper, leg 472 may comprise .0005 inch "Permalloy," "Supermalloy," "Deltamax" or "Supermendur," and gap spacer 482 defining gap 477 may comprise a strip of copper having a thickness of 0.00005 inch. Windings 490 and 491 on legs 471 and 473 may be connected in an electric circuit identical to that for the windings 423, 424 and 453 in FIGURE 14 and corresponding reference numerals have been affixed to the respective leads in the two figures to indicate this fact. Thus leads 492 and 493 in FIGURE 16 may connect to terminal 420 and terminal 432 of FIGURE 14, respectively. Line 494 in FIGURE 16 may connect to terminal 432, line 495 may connect to terminal 421 and line 496 may connect to terminal 451 of FIGURE 14. As in the embodiments of FIGURES 13 and 15, the trailing leg 473 may have substantially less width than the other legs and may have filler members 498 and 499 of substantial thickness at the opposite sides thereof. The operation of the circuit for the embodiment of FIGURES 16 and 17 is the same as that for the circuit of FIGURES 14 and 15 with an erasing field being produced across the gap 475 for erasing the record medium 340 and the recording and playback functions taking place as in the embodiment of FIGURES 14 and 15.

Figure 17:
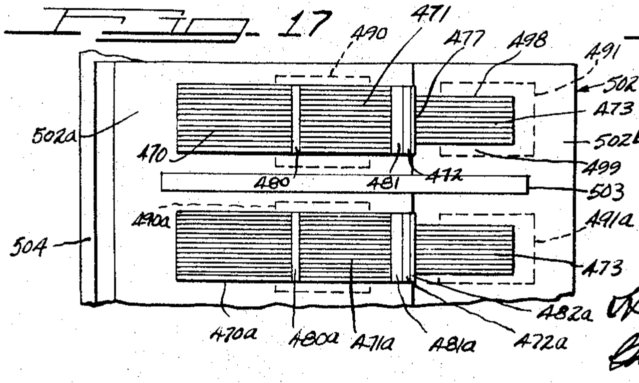
FIGURE 17 is a somewhat diagrammatic top plan view of the structure of FIGURE 16.

As indicated in FIGURE 17, a housing 502 may receive a succession of head units such as shown in FIGURE 16 with a shield of electrically conductive and/or magnetic material between successive head units as indicated at 503. The housing may be of electrically conductive non-magnetic material having a coefficient of expansion corresponding to that of the magnetic core material as in FIGURE 1 and may be in two parts **502*a* and 502*b* similar to parts 51 and 61 in FIGURE 1. A surrounding casing of magnetic shielding material may be provided as indicated at 504 similar to casing 80 in FIGURE 3 and which clamps housing parts 502*a* and 502*b*** together in the same way as illustrated in FIGURE 3. Corresponding reference numerals followed by the letter *a* designate parts of the second head unit corresponding to the respective parts of the head unit of FIGURE 16.

Figure 19:
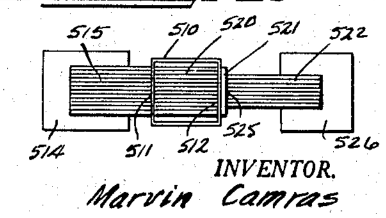
FIGURE 19 is a diagrammatic top plan view of a head such as shown in FIGURES 12 and 13 which has been modified to have a closed electric circuit extending through the erase and cross field gaps.

FIGURE 19 shows a head which may be identical to that of FIGURES 16 and 17, for example, except that a loop electric circuit 510 extends through erase gap 511 and cross field gap 512 and an erase-bias coil 514 is on an outer leg 515. The head includes legs 515, 520, 521 and 522 defining erase gap 511, cross field gap 512 and record-playback gap 525 with a bias and signal winding assembly 526 on leg 522 which may be connected with erase-bias coil 514 in the same way as indicated for windings 423 and 424, 453 in FIGURE 14. By way of example, the loop electric circuit may have a width or height dimension of .020 inch and a thickness dimension of .002 inch. The loop electric circuit serves to increase the coupling of the erase-bias coil 514 to the cross field magnetic circuit including legs 520 and 522 which correspond to legs 471 and 473 in FIGURE 16 during recording.

FIGURES 20 through 24 represent a preferred embodiment of the present invention wherein a magnetic transducer head 600 comprises a series of magnetic core parts 601, 602, 603, 604 and 605 defining erase gaps 610 and 611, a cross field gap 612 and a record-playback gap 613. A non-magnetic spacer 620 is interposed between the lower portions of core legs 602 and 604 to introduce a substantial reluctance in the magnetic circuit including legs 602, 603 and 605 and cross field gap 612 to tend to minimize the coupling of magnetic signal flux from the record medium at gap 612 to winding 625 during playback. It has been found that with a construction as in FIGURE 20, distortion of the output from the signal winding 625 as a function of recorded wavelength (such as indicated in FIGURE 18) is avoided. Thus the compensating means of the preceding embodiments is not required during playback with the embodiment of FIGURE 20.

Figures 22, 23, 24:
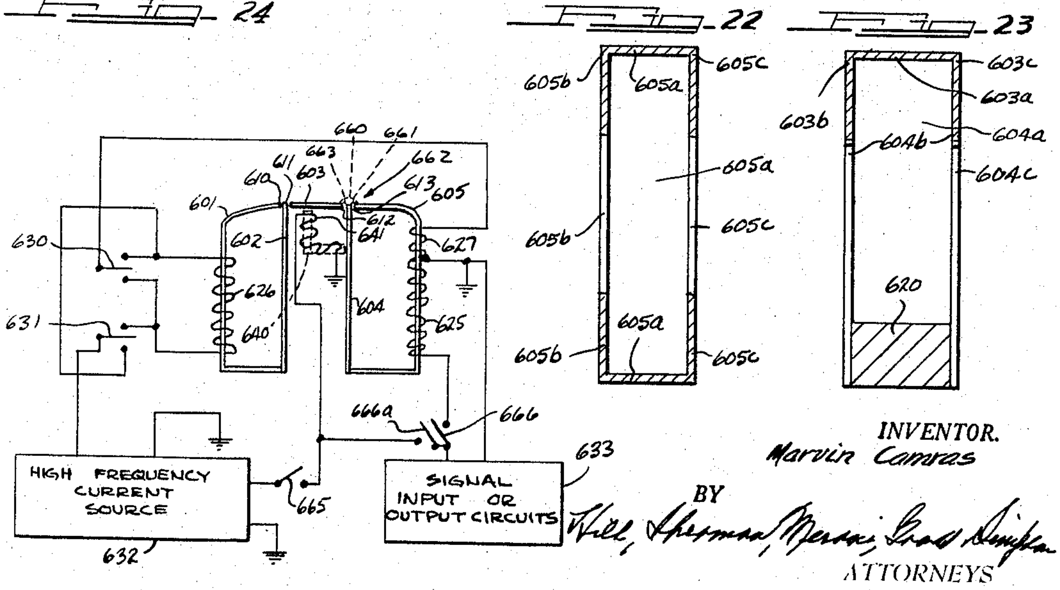
FIGURES 22 and 23 are vertical sectional views taken along the lines XXII—XXII and XXIII—XXIII, respectively, in FIGURE 21.
FIGURE 24 is a diagrammatic view showing an electric circuit for the embodiment of FIGURES 20–23.

An erase frequency energizing coil 626 is on the leg 601 of the core and a bias winding 627 is on leg 605 along with signal winding 625. As indicated in FIGURE 24, during recording switch arms 630 and 631 are closed in a downward position to supply high frequency current to erase winding 626 and bias winding 627 in series. A high frequency current source is indicated at 632 and a signal input or output circuits component is indicated at 633 connected with the signal frequency winding 625. The high frequency current is of course of a substantially higher frequency than the highest signal frequency component to be recorded. A further optional source of bias frequency magnetic field is indicated in FIGURE 24, in dash outline as including a magnetic core part 640 and a winding 641 for producing a cross field in the region of recording gap 613. Winding 641 may be a coil on either leg of the L-shaped core 640. The spaces between the ends of core 640 and the adjacent core pieces 603 and 604 may be adjusted to minimize interference from pickup at gap 612, and also to set the level of the X-field relative to the small-gap field.

Figure 20:
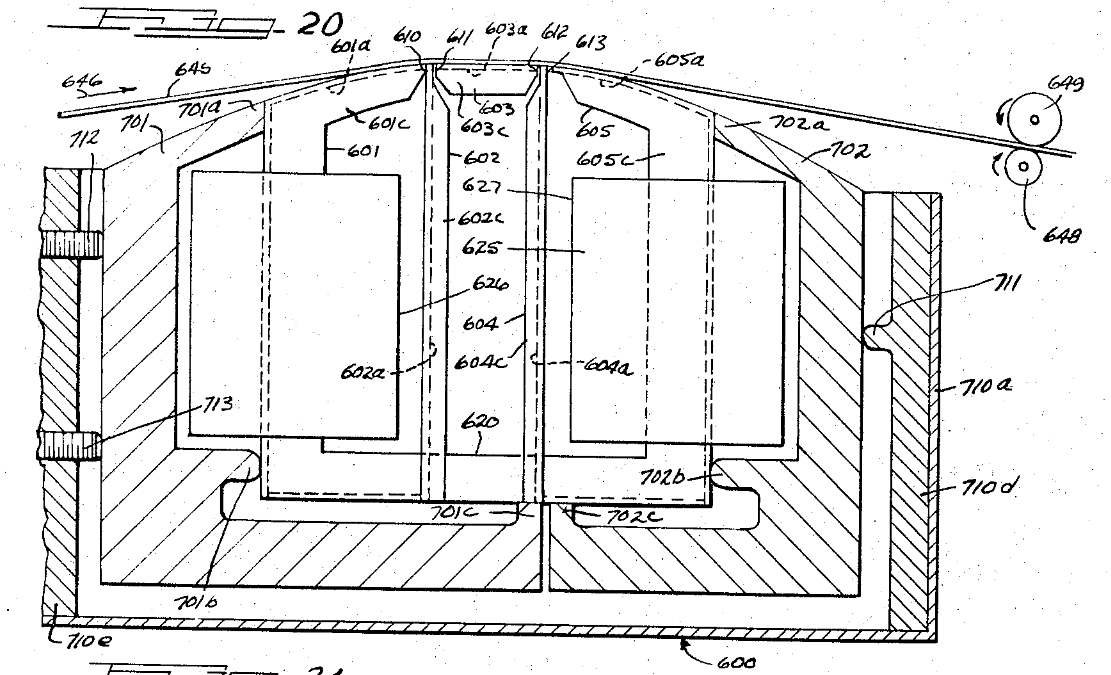
FIGURE 20 is a diagrammatic vertical sectional view of a further embodiment of magnetic transducer assembly.

As indicated in FIGURE 20, a tape record medium 645 may have its magnetizable layer in sliding contacting relation to the surfaces of legs 601, 602, 603, 604 and 605 which extend adjacent the tape path and the tape may be driven in the direction of the arrow 646 by means of a suitable constant speed drive including capstan member 648 and pressure roll member 649 so that the tape travels successively across the erase gaps 610 and 611, across cross field gap 612 and then across the record gap 613.

In this embodiment, rather than using laminated core parts which are relatively expensive and difficult to assemble to form a magnetic head, the core parts 601–605 may be formed from a flat sheet by a die into a U cross section as indicated in FIGURES 22 and 23 and annealed after mechanical operations are completed. Each of the core parts thus has a generally planar body portion such as indicated at **603*a* and 605*a* in FIGURES 22 and 23 and has right angle flange portions such as indicated at 603*b* and 603*c* and 605*b* and 605*c* in FIGURES 22 and 23. The thickness of sheet material from which the core is formed depends on the head dimensions and on the allowable eddy current losses. For a quarter track head, 0.043 inch wide, "Permalloy" stock 0.006 inch thick has proved very satisfactory. Heads of this construction have been used with bias frequencies of 100 kc. and have given satisfactory response to signals of 50 kc. and higher. Thicker material is siutable for lower frequencies or larger heads. The body portions of the respective core parts have the widths indicated in FIGURE 21, core parts 601, 602, 603 and 604 having a width substantially equal to the channel of the record tape 645 cooperating therewith while core part 605 has a substantially reduced width to insure complete erasure of the portion of the channel travelling across the record gap 613. A nominal width dimension for each recorded trace on four track stereo tapes is 0.043 inch. As seen in FIGURE 20, the width of the side flanges 601*b*, 602*b*, 603*b*, 604*b* and 605*b* and 601*c*, 602*c*, 603*c*, 604*c* and 605*c* may taper at the regions of the gaps 610–613 so as to tend to concentrate flux in the path of the record medium 645. The configuration of the side flanges of core parts 603 and 604 adjacent gap 612 provides a very sensitive and convenient adjustment of the magnitude of the cross field component extending from core part 603 to the trailing side of the record gap 613. Thus, the more extended the area and the closer the reatlionship between the side flange parts 603*b* and 604*b* and 603*c* and 604*c*, where they meet at the gap 612, the smaller the magnitude of the cross field component adjacent gap 613**.

By way of example, the polepieces 601–605 may be of .005 inch thick "Permalloy" and may have an overall height in the plane of FIGURE 20 of 0.5 inch. Polepiece 605 may have a width of .043 inch while polepieces 601–604 may have a width of about .047 inch after forming into U cross section. Erasing gaps 610 and 611 may have a length in the direction of tape movement of .002 inch, each; cross field gap 612 may have a length in the direction of tape movement of .001 inch; and gap 613 may have a length in the direction of tape movement of .00005 inch. The magnetic tape layer thickness may be .0003 inch to .0005 inch. The body part **604*a* of polepiece 604 adjacent the tape path may be reduced in thickness compared to the remainder of the body portion and may have a thickness dimension in the direction of tape movement of .0005 inch, for example. Core parts 601–604 may have a width 10% to 20% greater than the width of core part 605, for example. It will be understood that the relatively intense high frequency field between core parts 603 and 604 across gap 612 may assist in the erasure of the record medium. Winding 626 also provides a cross field component in air between core parts 603 and 605. Coil 626 may have 1000 turns and coils 625 and 627 may comprise 1000 turns tapped at 48 turns and at 144 turns from the top. A high frequency bias current of 3.5 milliamperes at 100 kc. may be used to energize coil 626 and 96 turns of coil 625, 627 in series opposed connection with 626. A recording signal of 20 cycles to 20 kc. at 0.1 milliampere may be fed through coil 626 plus 144 turns of 625, 627**, also series bucking. The channel construction described gives a self-supporting polepiece having increased cross section by virtue of the lateral flanges, and low eddy current loss. The gap defining portions may be the same as the sheet thickness (for example 0.005 inch), requiring no machining. The core material is in an unstressed condition compared to laminations which are glued and clamped after anneal.

As indicated in FIGURE 24, the embodiment of FIGURE 20 includes the case where switch arms 630 and 631 are in their upper positions to supply a cross field component between core parts 603 and 605 in opposing relation at the trailing side of gap 613 and the case where the switch arms 630 and 631 are in their lower positions to generate a cross field component between core parts 603 and 605 which is substantially in aiding relation to the main bias field across gap 613 at the trailing side of the gap 613. The additive cross field arrangement with switch arms 630 and 631 in their lower positions provides results which under certain conditions compare quite favorably with the results obtained for an opposing cross field (with switch arms 630 and 631 in their upper positions). The signal cross field may also be additive in conjunction with opposing or additive bias cross field. It is believed that an important advantage achieved by the cross field is in providing a relatively uniform bias field intensity throughout the thickness of the magnetizable layer of the tape and either the additive or opposing cross field provides this advantage. Thus, an important concept is to provide a cross field component such as indicated at 660 in FIGURE 24 bridging in air between core parts 603 and 605 and of magnitude in the recording region at the trailing side of the recording gap 613 approximating the bias amplitude required for optimum recording. Where there is a main bias field as indicated at 661 between core parts 604 and 605 produced by a winding such as indicated at 627, the cross field component as indicated at 660 produced by erase winding 626 should be at least of a substantial magnitude in comparison with the main bias field 661 in the recording region which has been indicated at 662. One suitable value in this case has been found to be a value of cross field component 660 equal to approximately ⅔ of the main field component 661 whether the cross field component is aiding or opposing the main field at the recording region 662. A further embodiment for the head of FIGURE 20 involves the omission of the bias winding section 627. In this case, the erase winding 626 will produce a first generally semi-circular field configuration 663 across gap 612, a second generally semi-circular field configuration 661 across gap 613 and a cross field component such as 660 between core parts 603 and 605. In this case, of course, the cross field component 660 and the main field component 661 are additive in the recording region 662. Winding 627 may be omitted as a bias frequency winding by connecting the signal circuits component 633 across winding sections 625 and 627 together with the upper terminal of winding section 627 grounded rather than the upper terminal of winding 625 being grounded as shown in FIGURE 24.

Of course, if winding 627 is omitted, a winding such as indicated at 641 may be energized by closing switch 665 during recording to increase the strength of the cross field component 660 and the main field component 661. In each of the above cases, switch 666 may be in its right hand position to supply recording signal current to winding section 625.

As a further alternative represented by the embodiment of FIGURE 20, switch arm **666*a* may be in its left hand position to supply signal recording current to winding 641 only (switch 665 being open or closed as desired) while the bias field components may be provided in any of the manners described. This configuration has the advantage of providing a more uniform signal field throughout the cross section of the magnetizable layer of the tape at low frequencies particularly. In effect, energization of winding 641 with signal current produces field components such as indicated at 660, 661 and 663 with the cross field component 660 additive with the main field component 661 in the recording region 662 the same as with a bias field configuration omitting winding 627. In any of the embodiments, playback may be obtained by moving switch 666 to its right hand position and leaving switch means 665, 666*a*, 630 and 631** in their intermediate open positions shown in FIGURE 24.

As another alternative, switch arms 666 and **666*a* may both be closed to provide a signal field at gap 613 due to winding 625 as well as a signal cross field from winding 641. These fields may be additive or opposing in region 662. Bias from source 632 is then supplied to both winding 641 and winding 625 with winding 627 omitted, and the bias cross field may be additive or opposing to the main bias field in region 662**.

While A.C. bias has been mentioned in the above explanation because it is widely used, similar advantages are obtained with these structures when D.C. bias is used. The structures are also applicable where bias is not used.

While in FIGURES 20–24, a channel or U cross section has been specifically shown for core parts 601–605, other cross sections will produce the advantages of larger flux carrying capacity with low eddy current loss. For example, the core parts may have an L cross section. A generally spiral cross section may also be formed in an initially flat sheet by bending the sheet at right angles at successively increasing intervals. In this case the sheet would be flat between successive right angle bends. The adjacent parallel portions of the sheet are suitably insulated to avoid forming a closed loop electric circuit for eddy currents.

The core parts 601–605 may also have a generally O cross section with flat sides similar to one convolution of the spiral type cross section. The free edges of the magnetic sheet formed into an O cross section would have a non-conductive gap therebetween to avoid a closed loop electric circuit for eddy currents.

An O cross section may also be formed by nesting the lateral flanges of a pair of oppositely directed strips of channel cross section. The adjacent overlapping lateral flanges of the respective strips would be insulated from each other to avoid forming a closed loop electric circuit for eddy currents above the perimeter of the O cross section.

As a further example, a series of channel cross section strips of different size and all oriented in the same way may be nested one within the other to form a large area C cross section. A channel or C cross section type core leg may have a solid cross section non-magnetic filler nester therein to rigidify the leg. The filler may be non-conductive or insulated from the core leg to avoid formation of an electrically conductive loop path about the perimeter of the square or rectangular cross section defined by the leg and filler.

The spiral and O cross sections just described are advantageous over conventional laminated core parts because of their ease of assembly and relatively unstressed magnetic condition as finally assembled. The spiral and O cross section core parts are advantageous over solid cross section parts of comparable flux carrying capacity because of their reduced eddy current loss. The spiral and O cross sections provide more flux carrying capacity than a simple channel cross section, but are somewhat more difficult to fabricate and assemble. The non-magnetic filler provides increased rigidity over the simple channel cross section core part.

Figure 21:
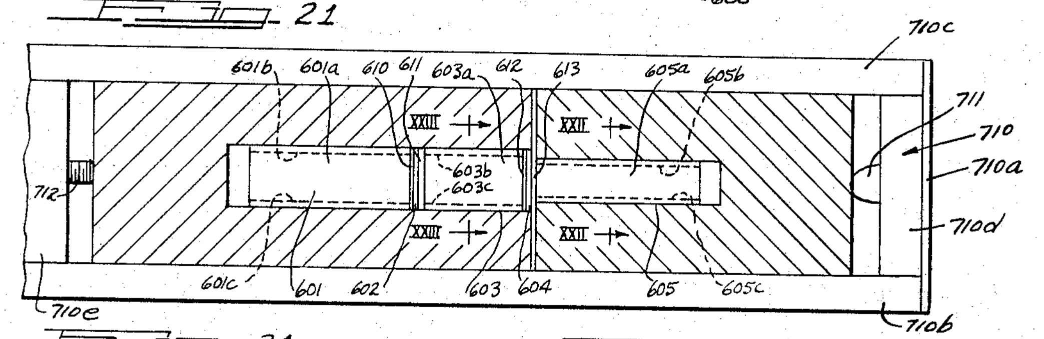
FIGURE 21 is a horizontal sectional view of the assembly of FIGURE 20.

It will be understood that the housing shown in FIGURES 20 and 21 is substantially identical to that illustrated in FIGURE 3 and comprises casing parts 701 and 702 engaging the respective core sections at points **701*a*, 701*b*, 701*c* and 702*a*, 702*b* and 702*c*, respectively. As in the embodiment of FIGURES 1–3, the casing parts 701 and 702 may be made of a non-magnetic metal having substantially the same thermal coefficient of expansion as the core parts 601–605. The casing parts 701 and 702 have interior air spaces so that there is no problem of expansion or swelling with heat or humidity which would tend to open the fine gap 613 as would be the case if these spaces were filled with epoxy resin or the like. Any cement which is used, for example between bosses 701*a*–701*c* and 702*a*–702*c*** and the core, is in a thin layer which cannot appreciably affect the gap dimension.

The casing parts 701 and 702 may have closely confronting mating surfaces with recesses therein such as indicated at 91–94 in FIGURES 1–3 for receiving a cement to retain the two sub-assemblies against relative lateral displacement. A housing 710 including plates **710*a*–710*c* of magnetic shielding material may surround the casing parts 701, 702. A housing plate 710*d* may have a boss portion 711 engaging one of the casing parts and a housing plate 710*e* may have set screw means such as indicated at 710 and 713 engaging the opposite casing part to press the casing parts together. The arrangement is such that the polar portions defining the gap 613** are pressed toward each other against the gap material intervening therebetween to precisely determine the gap spacing.

It will be apparent that a number of head units including core parts such as 601–605 may be associated with respective unitary housing parts such as indicated at **502*a* and 502*b* in FIGURE 17. Magnetic or electrically conductive shielding members or both may be interposed between the successive head units in the same manner as indicated at 503 in FIGURE 17. Further, one or more of the core legs, particularly those which do not require windings, in FIGURES 17 or 20, may be common to all of the head units and extend through gaps in the shield members such as indicated at 503 in FIGURE 17. Thus, in FIGURE 17, the core leg 472 may be common to all the head units and the portions 472 and 472***a* in FIGURE 17 would then be part of a single common core member which would extend through a suitable gap in the shield member 503.

It will be apparent that the various circuit arrangements illustrated in any of the various figures generally may be applied to any of the core structures illustrated herein, and that the features of core configuration and mounting described with respect to any embodiment generally may be applied to the other illustrated embodiments. It is further noted that the specific numerical examples of gap spacings, numbers of turns for windings and the like are generally applicable to any of the embodiments and are given simply by way of illustration and not of limitation.

With respect to each of the embodiments, it is preferable to have the pole between the cross field and recording gaps as thin as possible in the direction of tape movement thereacross subject to practical limitations of a mechanical nature and the need to avoid saturation of the pole during recording or inadequate flux carrying capacity during playback; for example, it is preferable to have the pole thickness equal to or less than two mils (.002 inch).

In each of the embodiments, the cross field gap may be defined by a gap spacer of beryllium copper having a thickness of .001 inch and the recording gap may be defined by a gap spacer of beryllium copper having a thickness of .00005 inch. The tape may have a magnetizable layer .0003 to .0005 inch thick in sliding contact with the successive poles. The pole between the cross field and erase gaps may have a thickness dimension in the direction of tape movement where it contacts the tape of .0005 inch.

By way of a further specific example and not of limitation, each of the embodiments may utilize an electric circuit as indicated in FIGURE 8 with a winding 260 coupled to the cross field magnetic circuit including legs 20 and 21 having 1000 turns and a winding 729 having 1000 turns coupled to the record-playback magnetic circuit including legs 21 and 22. The winding 729 coupled to the record-playback magnetic circuit may be tapped at 48 turns from the top as indicated at 730 and may be tapped at 144 turns from the top as indicated at 731. Thus winding section 732 has 48 turns, winding section 261 has 96 turns and winding section 267 has 856 turns. During recording a high frequency bias current of 3.5 milliamperes at a frequency of 100,000 cycles per second is supplied to winding 260 and winding section 261 in series. Thus the bias supply would be connected between terminals 265 and 266 in FIGURE 8. A recording signal having frequency components between 20 cycles per second and 20,000 cycles per second at 0.1 milliampere may be supplied between terminals 733 and 266 to energize winding 260 and winding sections 732 and 261 in series. Bias current would then flow in 96 turns of winding 729 while recording signal current would flow in 144 turns of winding 729. While in FIGURE 8, the windings 260 and 729 are shown in aiding relation with respect to recording region 120, the example applies where the direction of winding 260 is reversed to provide signal and bias fields in region 120 which are in phase opposition to the signal and bias fields produced by winding 729. With the present example, the playback amplifier would be connected to winding 729 only.

When the circuit just described is applied to the embodiment of FIGURES 20–24, winding 260 would be placed on core part 640 and winding 729 placed on leg 605, for example.

As a further modification which will be practical in many instances, the winding 42 in FIGURES 1–6, the winding sections 246 and 247 in FIGURE 7, 261 and 267 in FIGURE 8, 271 in FIGURE 9, 281 and 288 in FIGURE 10, 301 and 308 in FIGURE 11, and 364 and 380 in FIGURES 12 and 13 may be used alone for playback. This arrangement may be preferred for simplicity, especially where the head is proportioned and adjusted so that interference is negligible without the use of a compensating winding linking the cross field magnetic circuit.

It will be apparent that many modifications and variations may be effected without departing from the scope of the novel concepts of the present invention.

I claim as my invention:

1. A magnetic head comprising a magnetic core having cross field core means defining a first pole and recording core means defining second and third poles, means for defining a path of travel of a record medium successively across said first, second and third poles, signal magnetic field producing means for coupling to said cross field core means to produce a signal magnetic field between said first and third poles varying in accordance with a signal to be recorded, bias field producing means coupled to said cross field core means for producing a bias magnetic field between said first and third poles, and bias field producing means coupled to said recording core means for producing a bias magnetic field between said second and third pole means having a magnitude comparable to the magnitude of the bias magnetic field between said first and third poles.

2. A magnetic head for coupling to a magnetic record medium comprising a magnetic core having a cross field magnetic circuit and a recording magnetic circuit with a cross field gap and a recording gap respectively therein across which the record medium successively travels, means for coupling to said cross field circuit for establishing a magnetic field bridging said cross field and recording gaps in series, and means for introducing a reluctance in said cross field circuit for signal recorded wavelengths comparable to the spacing between the cross field and recording gaps, of the order of the reluctance of an air path equal to the width dimension of the core to reduce the coupling of said signal recorded wavelengths to a magnetic circuit including the cross field and recording gaps in series during playback.

3. A magnetic head comprising a magnetic core having cross field core means defining a first pole and recording core means defining second and third poles, means defining a path of travel of a record medium successively across said first, second and third poles, magnetic field producing means coupled to said cross field core means for establishing a magnetic field between said first and third poles and coupled to said recording core means for establishing a magnetic field between said second and third poles, said cross field core means comprising at least two separate core parts one extending generally along the path of the record medium and terminating in said first pole and a second core part having one end adjacent said one core part and having its opposite end more remote from said one core part with a substantial non-magnetic gap between at least one of the ends of said second core part and other portions of said core of length comparable to the length of said one of said core parts.

4. A magnetic head comprising a magnetic core having cross field magnetic core means defining a first magnetic pole and recording magnetic core means defining second and third magnetic poles, means defining a path of travel of a magnetic record medium successively across said first, second and third magnetic poles, means for establishing a signal magnetic field between said first and third magnetic poles varying in accordance with an input signal to be recorded on the record medium and for establishing a second magnetic field across said second and third magnetic poles for acting on the record medium during recording, and the length of the second pole in the direction of travel of the record medium being not greater than the spacing between said first and second poles.

5. A magnetic head comprising a magnetic core having a pair of oppositely directed C-shaped core members each having at one end thereof a polar extremity directed toward the polar extremity of the other C-shaped core member, a pair of substantially straight core members extending generally across the extremities of the respective C-shaped core members and having polar extremities disposed in spaced confronting relation to the polar extremities of the C-shaped core members, a further core member interposed between the substantially straight core members and extending generally between the polar extremities of the straight core members and having polar extremities at the opposite ends thereof in spaced confronting relation to the respective polar extremities of the substantially straight core members, the polar extremities of said core members defining in succession along a path of travel for a record medium across said core first and second erase gaps, a cross field gap and a recording gap, said further core member having separate core means adjacent thereto for defining a portion of a magnetic circuit including said further core member and said cross field gap, and winding means on said separate core means for producing a magnetic field which extends across the cross field gap and recording gap in series during recording operation.

6. A magnetic head comprising a magnetic core having first, second and third magnetic poles past which a magnetic record medium is to successively travel, the second and third poles being substantially more closely spaced than said first and second poles, and winding means coupled to said core for producing the entire magnetic signal field which is to produce a recording on the record medium, said winding means in its entirety being substantially closer to said first pole than to said third pole.

7. A magnetic head comprising a magnetic core having first, second and third magnetic poles past which a magnetic record medium is to successively travel, winding means coupled to said core for producing the entire magnetic signal field which is to produce a recording on the record medium, said winding means in its entirety being substantially closer to said first pole than to said third pole, and means coupled to said core for producing a resultant bias magnetic field in the region of said third pole having a substantially sharper gradient in field intensity with respect to the direction of movement of the record medium through said region than the signal field gradient in said region.

8. A magnetic head comprising a magnetic core having a cross field magnetic circuit and a recording magnetic circuit with respective cross field and recording non-magnetic gaps across which a record medium is to successively travel, a first winding coupled to said cross field magnetic circuit, a second winding coupled to said recording magnetic circuit, and signal input means for energizing said first and second windings during recording to produce respectively first and second signal magnetic fields having components of the same frequency in the region of the recording gap which are in aiding relationship at the trailing side of the recording gap with respect to the direction of travel of the record medium.

9. A magnetic head comprising a magnetic core having a cross field magnetic circuit and a recording magnetic circuit with respectively a cross field gap and a recording gap across which a record medium is to successively travel, and means for applying a signal magnetomotive force exclusively to the cross field magnetic circuit to produce a net relatively diffuse signal magnetic field in the region at the trailing side of the recording gap as the sole magnetic field of signal frequency active on the record medium in said region.

10. In a magnetic transducer assembly, a magnetic transducer head comprising magnetic core means having first, second and third core parts of magnetic material, said core parts having polar extremities disposed in spaced series relation along and to one side of a path of a magnetic record medium with a first non-magnetic gap between the polar extremities of the first and second core parts and with a second non-magnetic gap between the polar extremities of the second and third core parts for coupling of the head to a magnetic record medium travelling along said path and successively across said first and second gaps, first winding means coupled to said first core part across which said record medium first travels as it moves along said path, second winding means coupled to said third core part across which said record medium last travels as it moves along said path, input signal supply means for supplying an input signal to be recorded, and input signal connecting means for connecting said input signal supply means to said first winding means only to generate an input signal magnetic field in the recording region at the trailing side of said second gap dependent in configuration and magnitude substantially only on the signal magnetomotive force produced by said first winding means.

11. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first and third poles and said cross field air path therebetween, a magnetomotive force source coupled to said cross field magnetic circuit for exerting a magnetomotive force in said cross field magnetic circuit to produce a magnetic cross field component extending along said cross field air path with the magnetic reluctance along said cross field magnetic circuit between said magnetomotive force source and said first pole being substantially less than the magnetic reluctance along said cross field magnetic circuit between said magnetomotive force source and said third pole, said system further comprising signal input means for supplying a signal current varying in accordance with a signal to be recorded, means for connecting said signal input means with said magnetomotive force source for exerting a signal magnetomotive force in said cross field magnetic circuit in accordance with a signal to be recorded and at a point having a separation from said first pole of substantially lesser reluctance than that of its separation from the third pole to produce a signal magnetic cross field component extending in air along said cross field air path between said first and third poles and having a substantial magnitude in said recording region, the first pole being disposed on the same side of the record medium path as said second and third poles and being in alignment with and preceding said second and third poles with respect to the direction of movement of the record medium along said record medium path, essentially the entire signal magnetomotive force being applied to said magnetic core having a separation from the first pole with a magnetic reluctance substantially less than that of its separation from the third pole, and means coupled to said magnetic core for producing a magnetic biasing field in said recording region which decays in intensity more rapidly than does the complete signal field in said recording region with respect to said direction of said record medium path away from said recording gap.

12. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first and third poles and said cross field air path therebetween, a magnetomotive force source coupled to said cross field magnetic circuit for exerting a magnetomotive force in said cross field magnetic circuit to produce a magnetic cross field component extending along said cross field air path with the magnetic reluctance along said cross field magnetic circuit between said magnetomotive force source and said first pole being substantially less than the magnetic reluctance along said cross field magnetic circuit between said magnetomotive force source and said third pole, said system further comprising input means for supplying a signal current varying in accordance with a signal to be recorded, means for connecting said signal input means to said magnetomotive force source for exerting a signal magnetomotive force in said cross field magnetic circuit at a point having a separation from the first pole with a magnetic reluctance substantially less than that of its separation from the third pole to produce a signal magnetic cross field component varying in accordance with a signal to be recorded extending in air along said cross field air path between said first and third poles and having a substantial magnitude in said recording region, a further magnetomotive force source coupled to said recording magnetic circuit, and means for connecting said signal input means to said further magnetomotive force source to establish a signal field component between said second and third poles and having a magnitude in said recording region comparable to the magnitude of the signal magnetic cross field component in said recording region to produce a composite signal field in said recording region capable of effectively producing a recording of said signal on the record medium moving along said record medium path, said first pole being disposed on the same side of the record medium path as said second and third poles and being in alignment with and preceding said second and third poles with respect to the direction of movement of the record medium path and being separated from said second pole by a cross field gap, said second pole having a dimension in the direction of movement of the record medium comparable to the dimension of the cross field gap in the direction of movement of the record medium, and the recording gap between said second and third poles being of substantially less length than said cross field gap in the direction of movement of the record medium.

13. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first and third poles and said cross field air path therebetween, a magnetomotive force source coupled to said cross field magnetic circuit for exerting a magnetomotive force in said cross field magnetic circuit to produce a magnetic cross field component extending along said cross field air path with the magnetic reluctance along said cross field magnetic circuit between said magnetomotive force source and said first pole being substantially less than the magnetic reluctance along said cross field magnetic circuit between said magnetomotive force source and said third pole, said system further comprising said first pole being disposed on the same side of the record medium path as said second and third poles and being in alignment with said first and second poles with respect to the direction of movement of the record medium along said record medium path, said magnetomotive force source comprising an electrical conductor extending transversely to the record medium path adjacent said first pole and on the side of said first pole toward said third pole, and means for supplying a recording current to said electrical conductor to establish a recording magnetic cross field extending in air along said cross field air path and having a substantial magnitude in said recording region, said electrical conductor being substantially closer to said first pole than to said third pole.

14. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first and third poles and said cross field air path therebetween, a magnetomotive force source coupled to said cross field magnetic circuit for exerting a magnetomotive force in said cross field magnetic circuit to produce a magnetic cross field component extending along said cross field air path with the magnetic reluctance along said cross field magnetic circuit between said magnetomotive force source and said first pole being substantially less than the magnetic reluctance along said cross field magnetic circuit between said magnetomotive force source and said third pole, said system further comprising said first pole being disposed on the same side of the record medium path as said second and third poles and being in alignment with said first and second poles with respect to the direction of movement of the record medium along said record medium path, said magnetomotive force source comprising an electrical conductor extending adjacent said first pole and substantially closer to said first pole than to said third pole, means for energizing said conductor with bias frequency electric current to establish a bias frequency magnetic cross field along said cross field air path and having a substantial magnitude in said recording region, and means coupled to said recording circuit for producing a magnetic signal field between said second and third poles and of substantial magnitude in said recording region.

15. In a magnetic recording system comprising a magnetic core having a record medium path along which a record medium is to travel and having first, second and third poles for coupling with a channel of a magnetic record medium in a recording region of said record medium path, said record and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first and third poles and said cross field air path therebetween, a magnetomotive force source coupled to said cross field magnetic circuit for exerting a magnetomotive force in said cross field magnetic circuit to produce a magnetic cross field component extending along said cross field air path with the magnetic reluctance along said cross field magnetic circuit between said magnetomotive force source and said first pole being substantially less than the magnetic reluctance along said cross field magnetic circuit between said magnetomotive force source and said third pole, said system further comprising said first pole being disposed on the same side of the record medium path as said second and third poles and being in alignment with said first and second poles with respect to the direction of movement of the record medium along said record medium, said magnetomotive force source comprising an electrical conductor extending adjacent said first pole and substantially closer to said first pole than to said third pole, means for energizing said conductor with bias frequency electric current to establish a bias frequency magnetic cross field along said cross field air path and having a substantial magnitude in said recording region, means coupled to said recording circuit for producing a further bias frequency magnetic field between said second and third poles and having a magnitude in said recording region comparable to the magnitude of said bias frequency magnetic cross field in said recording region, and means coupled to said recording circuit for producing a signal magnetic field between said second and third poles and having a substantial magnitude in said recording region.

16. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first pole with parallel branches thereof including said first and second poles in series, and said first and third poles and said cross field air path in series, respectively, a magnetomotive force source coupled to said cross field magnetic circuit for exerting a magnetomotive force in said cross field magnetic circuit to produce a magnetic cross field component extending along said cross field air path and to establish magnetic flux components in the same direction and in parallel through said parallel branches of said cross field magnetic circuit, said system further comprising said first pole being disposed on the same side of the record medium path as said second and third poles and being in alignment with and preceding said first and second poles with respect to the direction of movement of the record medium along said record medium path, signal input means for supplying essentially all of the signal current varying in accordance with a signal to be recorded to said system, and means for connecting said signal input means essentially exclusively to said magnetomotive force source and for applying essentially the entire signal magnetomotive force varying in accordance with the signal to be recorded to said cross field magnetic circuit to establish magnetic signal flux components having the same instantaneous polarity with respect to both said second and third poles and in said parallel branches of said cross field magnetic circuit.

17. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first pole with parallel branches thereof including said first and second poles in series, and said first and third poles and said cross field air path in series, respectively, a magnetomotive force source coupled to said cross field magnetic circuit for exerting a magnetomotive force in said cross field magnetic circuit to produce a magnetic cross field component extending along said cross field air path and to establish magnetic flux components in the same direction and in parallel through said parallel branches of said cross field magnetic circuit, said system further comprising signal input means for supplying essentially all of the signal current varying in accordance with a signal to be recorded to said system, and means for connecting said signal input means essentially exclusively to said magnetomotive force sources and for applying essentially the entire signal magnetomotive force varying in accordance with the signal to be recorded to said cross field magnetic circuit to establish magnetic signal flux components having the same polarity with respect to both said second and third poles and in said parallel branches of said cross field magnetic circuit.

18. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first pole with parallel branches thereof including said first and second poles in series, and said first and third poles and said cross field air path in series, respectively, a magnetomotive force source coupled to said cross field magnetic circuit for exerting a magnetomotive force in said cross field magnetic circuit to produce a magnetic cross field component extending along said cross field air path and to establish magnetic flux components in the same direction and in parallel through said parallel branches of said cross field magnetic circuit, said system further comprising

- signal input means for supplying essentially all of the signal current varying in accordance with a signal to be recorded to said system,
- means for connecting said signal input means essentially exclusively to said magnetomotive force source and for applying essentially the entire signal magnetomotive force varying in accordance with the signal to be recorded to said cross field magnetic circuit to establish magnetic signal flux components having the same polarity with respect to both said second and third poles and in said parallel branches of said cross field magnetic circuit,
- said first pole being disposed on the same side of the record medium as said second and third poles and being in alignment with and preceding said second and third poles with respect to the direction of movement of the record medium along said record medium path,
- first bias means coupled to said cross field magnetic circuit and exerting an alternating current high frequency bias magnetomotive force on portions of the magnetic core substantially closer to said first pole than to said third pole for establishing an alternating current high frequency bias magnetic cross field component along said cross field air path and in said recording region, and
- second bias means coupled to said recording magnetic circuit for exerting an alternating current high frequency bias magnetomotive force on portions of the magnetic core at least as close to said third pole as to said first pole for establishing an alternating current high frequency bias magnetic field between said second and third poles and in said recording region and having a magnitude in said recording region comparable to the magnitude of said high frequency bias magnetic cross field component in said recording region.

19. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first pole with parallel branches thereof including said first and second poles in series, and said first and third poles and said cross field air path in series, respectively, a magnetomotive force source coupled to said cross field magnetic circuit for exerting a magnetomotive force in said cross field magnetic circuit to produce a magnetic cross field component extending along said cross field air path and to establish magnetic flux components in the same direction and in parallel through said parallel branches of said cross field magnetic circuit, said system further comprising

- alternating current high frequency bias input means for supplying essentially the entire high frequency bias current to said system and having a frequency substantially higher than the highest signal frequency component to be recorded,
- means for connecting said high frequency bias input means essentially exclusively to said magnetomotive force source so that the entire high frequency bias magnetomotive force applied to said core is applied predominantly to said cross field magnetic circuit and to said branches thereof in parallel, and
- means coupled to said magnetic core for producing a magnetic signal field in said recording region varying in accordance with a signal to be recorded.

20. In a magnetic recording system comprising a magnetic core having a record medium path along which a record medium is to travel and having first, second and third poles for coupling with a channel of a magnetic record medium in a recording region of said record medium path, said second and third poles being disposed ajacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first and third poles and said cross field air path therebetween, a magnetomotive force source coupled to said cross field magnetic circuit for exerting a magnetomotive force in said cross field magnetic circuit to produce a magnetic cross field component extending along said cross field air path with the magnetic reluctance along said cross field magnetic circuit between said magnetomotive force source and said first pole being substantially less than the magnetic reluctance along said cross field magnetic circuit between said magnetomotive force source and said third pole, said system further comprising

- signal input means for supplying essentially the entire signal current varying in accordance with a signal to be recorded by said system,
- alternating current high frequency bias input means for supplying essentially the entire high frequency bias current to said system having a frequency substantially higher than the highest signal frequency component to be recorded, and
- means for connecting said signal input means and said high frequency bias input means essentially exclusively to said magnetomotive force source for exerting a signal magnetomotive force and an alternating current high frequency bias magnetomotive force on portions of the magnetic core substantially closer to said first pole than to said third pole for establishing a signal frequency magnetic cross field and a bias frequency magnetic cross field of substantial magnitude in said recording region.

21. In a magnetic recording system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first pole with parallel branches thereof including said first and second poles in series, and said first and third poles and said cross field air path in series, respectively, a magnetomotive force source coupled to said cross field magnetic circuit for exerting a magnetomotive force in said cross field magnetic circuit to produce a magnetic cross field component extending along said cross field air path and to establish magnetic flux components in the same direction and in parallel through said parallel branches of said cross field magnetic circuit, said system further comprising said first pole being disposed on the same side of the record medium path as said second and third poles and being in alignment with and preceding said second and third poles with respect to the direction of movement of the record medium along said record medium path, signal input means for supplying a signal current varying in accordance with a signal to be recorded on a record moving along said record medium path, and means for connecting said signal input means with said magnetomotive force source for exerting a signal magnetomotive force varying in accordance with the signal to be recorded in said cross field magnetic circuit and in said branches of said cross field magnetic circuit in parallel.

22. A magnetic recording system comprising a magnetic core having first, second and third poles, with a cross-field gap between the first and second poles and with a recording gap between said second and third poles, a magnetic record medium traveling successively across said first, second and third poles in the order named with said first, second and third poles all being on the same side of said magnetic record medium, signal input means coupled to said magnetic core for producing a predetermined maximum recorded amplitude on the magnetic record medium, said magnetic recording system further comprising an electric winding coupled to the magnetic core at location closer to the first pole than to the third pole, and means for supplying an electric bias current to said winding for establishing a magnetic bias field between said first and third poles, the magnetic field incidentally produced between the first and second poles being inoperative by itself to act as an effective erasing field for erasing said predetermined maximum recorded amplitude from the record medium, and means for completely erasing said record medium prior to the time the record medium reaches said cross field gap.

23. In a magnetic transducer system comprising a magnetic core having a record medium path along which a record medium is to travel and having first, second and third poles for coupling with a channel of a magnetic record medium in a recording region of said record medium path, said second and third poles being disposed adjacent and on the same side of the record medium path and being disposed in alignment with respect to a direction of movement of a magnetic record medium along said record medium path and having a recording gap therebetween, said magnetic core having a recording magnetic circuit of closed loop configuration including said second and third poles and said recording region, said first and third poles having a cross field air path therebetween intersecting said recording region of said record medium path, said magnetic core having a cross field magnetic circuit of closed loop configuration including said first and third poles and said cross field air path therebetween, said system comprising means coupled to said core for producing a recording magnetic cross field component extending along said cross field air path and having a substantial magnitude in said recording region and for producing a further recording magnetic field component extending between said second and third poles and having a substantial magnitude in said recording region, and operative to record a signal on said record medium as it travels along said record medium path during a recording operation, said first pole being disposed on the same side of the record medium path as said second and third poles and being in alignment with and preceding said second an third poles with respect to the direction of movement of the record medium along said record medium path and being separated from said second pole by a cross field gap, said second pole having a dimension in the direction of movement of the record medium comparable to the dimension of the cross field gap in the direction of movement of the record medium, and the recording gap between said second and third poles being of substantially less length than said cross field gap in the direction of movement of the record medium, playback circuit means for coupling to said recording magnetic circuit during a playback operation to generate an electric signal varying in accordance with a signal recorded on a record medium moving along said record medium path and across said cross field gap and then across said recording gap, and means for substantially isolating said playback circuit means from signal magnetomotive forces applied by the portion of a magnetic record medium bridging said cross field gap and said recording gap in series.

24. The transducer system of claim 23 wherein said substantially isolating means comprises a nonmagnetic gap between said first pole and said recording magnetic circuit having a reluctance substantially greater than the reluctance of said cross field gap.

25. The method of operating a magnetic core having first, second and third poles on the same side of a record medium path which comprises moving a magnetic record medium along the record medium path and across the first, second and third poles in the order named, establishing a signal magnetic field varying in accordance with a signal to be recorded along an air path between said first and third poles and having a substantial magnitude in a recording region of the record medium path adjacent said third pole, and establishing a further recording magnetic field between said second and third poles and having a substantial magnitude in said recording region for contributing to the recording of the signal on the record medium.

26. The method of transducing signals by means of a magnetic core having first, second and third poles on the same side of a record medium path, which comprises relatively moving a magnetic record medium along the record medium path and across said first, second and third poles in the order named, establishing a signal field in accordance with a signal to be recorded at a recording region of the record medium path adjacent the third pole, establishing a magnetic bias field between said first and third poles having a substantial amplitude in said recording region effective to substantially contribute to the recording of said signal on the record medium, with the incidental effect of producing a magnetic field between said first and second poles of amplitude less than that required to insure erasure of a previously recorded signal on the record medium, and effectively erasing said previously recorded signal from the record medium immediately prior to the record medium passing through said incidentally produced magnetic field, whereby the bias field amplitude may be selected independent of any requirement that the field between said first and second poles act as an erasing field.

References Cited

UNITED STATES PATENTS

| | | | |
|---|---|---|---|
| 1,287,982 | 12/1918 | Hartley | 336—233 X |
| 2,540,711 | 2/1951 | Camras | 179—100.2 |
| 2,549,771 | 4/1951 | Camras | 179—100.2 |
| 2,658,113 | 11/1953 | Holmes | 179—100.2 |
| 2,702,835 | 2/1955 | Camras | 179—100.2 |
| 2,785,232 | 3/1957 | Camras | 179—100.2 |
| 2,786,897 | 3/1957 | Schwarz | 179—100.2 |
| 2,803,708 | 8/1957 | Camras | 179—100.2 |
| 2,888,522 | 5/1959 | McCutchen et al. | 179—100.2 |
| 3,043,919 | 7/1962 | Tannenbaum et al. | 179—100.2 |
| 3,094,772 | 6/1963 | Duinker | 179—100.2 |
| 3,163,720 | 12/1964 | Netznik | 179—100.2 |

BERNARD KONICK, *Primary Examiner.*

L. G. KURLAND, *Assistant Examiner.*